F. K. MALLISON.
DEMOUNTABLE RIM.
APPLICATION FILED DEC. 9, 1915.
1,378,968.
Patented May 24, 1921.
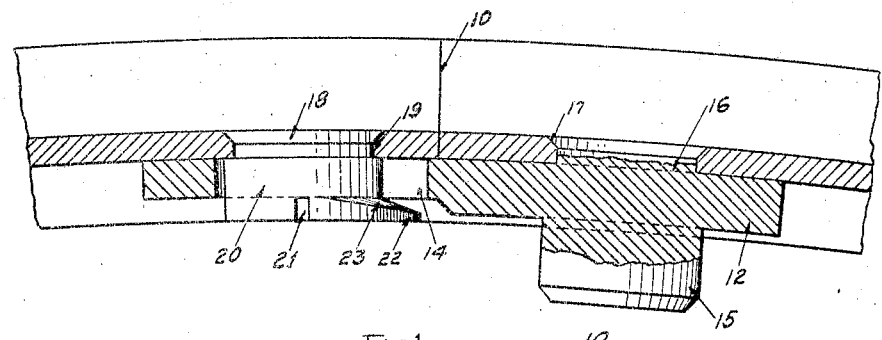
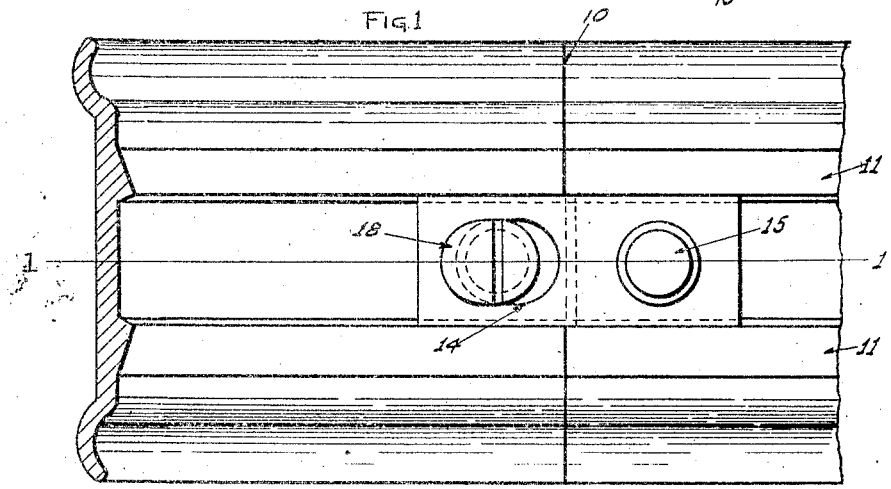
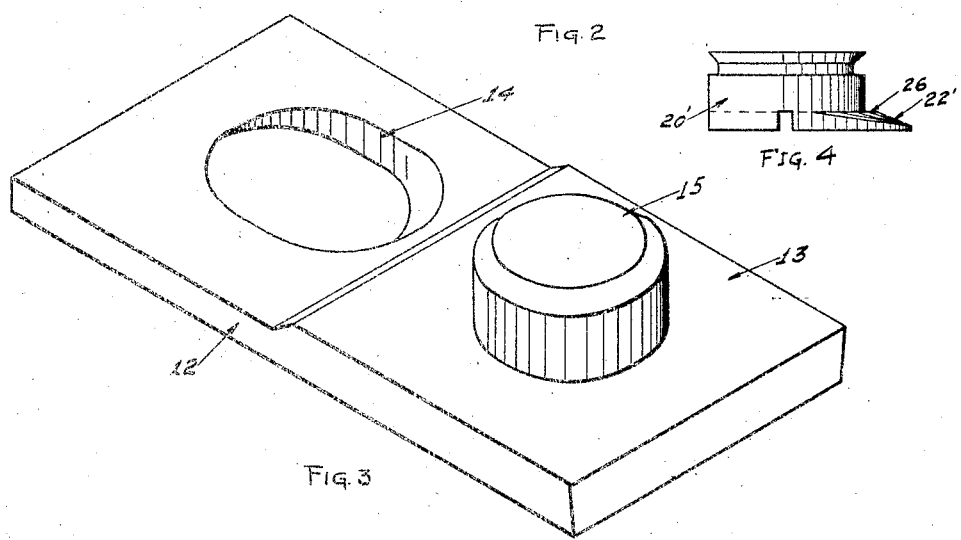
WITNESSES:
INVENTOR.
FRANK K. MALLISON
ATTORNEY

UNITED STATES PATENT OFFICE.

FRANK K. MALLISON, OF AKRON, OHIO, ASSIGNOR, BY MESNE ASSIGNMENTS, TO THE FIRESTONE STEEL PRODUCTS COMPANY, OF AKRON, OHIO, A CORPORATION OF OHIO.

DEMOUNTABLE RIM.

1,378,968.

Specification of Letters Patent. Patented May 24, 1921.

Application filed December 9, 1915. Serial No. 65,871.

*To all whom it may concern:*

Be it known that I, FRANK K. MALLISON, a citizen of the United States, residing at Akron, in the county of Summit and State of Ohio, have invented certain new and useful Improvements in Demountable Rims, of which the following is a specification.

This invention relates to that type of demountable rim commonly known as a "split rim" and particularly to the latch or fastening means which holds the ends of the rim together and at the same time furnishes a positive connection between the rim and the wheel, preventing relative movement. It has been the object of this invention to simplify the construction of the latch as much as possible in order that it may be made cheaply and in order that the operation of locking or collapsing the rim may be performed easily and quickly. These and other objects will be apparent from the following specifications and the accompanying drawing in which like reference numerals refer to like parts and in which:

Figure 1, is a longitudinal section of the meeting ends of the rim on the line 1—1 of Fig. 2, showing the fastening means in position for collapse of the rim.

Fig. 2, is a plan view looking at the latch from the inside of the rim showing the fastening means in closed position.

Fig. 3, is an isometric view of the latch.

Fig. 4, is a modification of the turn button.

The rim shown in the drawing is of the type known as straight side rim, but it is obvious that the invention is capable of application to rims of other types than that shown. The rim is split at 10, the particular split in this case being shown as a straight radial split, but the invention is not limited to application to this form alone as the split may be a diagonal or an irregular split.

On the under side of the rim, there are formed two inclined ribs 11, which are adapted to be associated with any suitable securing means for holding the rim on the wheel. These ribs may be omitted, however, and the under side of the rim formed smooth.

To one of the meeting ends of the rim is fastened a combined latch plate and dowel pin 12. This consists generally of a flat plate, one-half of the plate being under the end of the rim and formed with a raised portion 13, the other half extending beyond the rim end and having an oval shaped slot 14 punched therein. This recess or hole may take other shapes if desired, but it is believed that the one shown is the best for the purpose. The portion 13 of the latch is provided with an upstanding dowel 15 which is adapted to seat in a socket in the wheel when the rim is mounted in position forming a connection between the rim and wheel and prevent turning of the former on the latter. On the opposite face of the latch there is formed a projection 16 which is adapted to be received in a socket 17 in the end of the rim, it being the intention that the end of the projection be riveted into the socket to hold the latch securely.

On the opposite end of the rim at a position to be received in the aperture 14, a turn button or pin 18 is mounted for rotation in a socket 19. The button is enlarged below the under surface of the rim to form a head 20 in which is a kerf 21 for screw driver operation. One side of the button is extended over the head to form a locking surface 22, the under side of which is beveled as in 23. The upper surface of the button is in the form of an oval which is placed eccentrically with relation to the pivot point of the button, and when in the position shown in Fig. 1, the oval head of the button registers with the hole and the rim may be collapsed, the overhanging edge 22 passing freely through the slot 14. When turned to the position as shown in Fig. 2, with the ovals out of register, the wedge surface 23 on the button will ride over the outer edge of the slot pulling the latch into its seat and forming a perfect alinement of the rim ends. When completely turned to the position as shown in Fig. 2, the latch is firmly locked and the ends of the rim are securely held together.

In Fig. 4, is shown a slight modification of the button 20′, the wedge surface 22′ instead of terminating at the vertical face of the button is cut off to form a ledge 26. In locking position it will be seen that the flat surface formed on the button engages the under side of the latch and makes a more secure fastening for the rim.

Various other changes and modifications may be made without departing from the spirit of the invention or sacrificing any of

Claims:

1. In a demountable split rim, a fastening device comprising a plate secured to one end of the rim and overlapping the split and provided with a slot, a turn button having an overhanging portion relatively mounted on the other end of said rim adapted to pass through the slot in one position and to lock the rim in another position, and a wedge surface on the under side of said overhanging portion.

2. In a demountable split rim, a fastening device comprising a plate secured to one end of the rim and overlapping the split and provided with a slot, a turn button having an overhanging portion rotatively mounted on the other end of said rim adapted to pass through the slot in one position and to lock the rim in another position, and a wedge surface and a ledge portion on the under side of said overhanging portion.

FRANK K. MALLISON

Witnesses:
 J. J. SHEA,
 A. L. ELY.